United States Patent [19]
Davis

[11] Patent Number: 5,152,547
[45] Date of Patent: Oct. 6, 1992

[54] DUAL PISTON STRUT

[76] Inventor: Leo W. Davis, 5025 Arapaho, Suite 505, Dallas, Tex. 75248

[21] Appl. No.: 608,235

[22] Filed: Nov. 2, 1990

[51] Int. Cl.$^5$ .......................... B60G 11/26; F16F 5/00
[52] U.S. Cl. .................................. 280/707; 280/709; 280/714; 267/64.11; 267/64.13; 267/118; 188/313; 188/314
[58] Field of Search .................. 267/64.11, 64.13, 118, 267/126, 127; 188/313, 314, 289; 280/707, 709, 714, 702, 698, 690, 688

[56] References Cited

U.S. PATENT DOCUMENTS

| | | | |
|---|---|---|---|
| 3,367,453 | 2/1968 | Arendarski | 188/289 |
| 3,525,449 | 8/1970 | Zanow | 188/289 |
| 4,513,833 | 4/1985 | Sheldon | 280/705 |
| 4,730,816 | 3/1988 | Eckert | 280/707 |
| 4,735,402 | 4/1988 | Davis | 267/64.13 |
| 4,793,451 | 12/1988 | Taylor | 267/64.13 X |
| 4,846,317 | 7/1989 | Hudgens | 188/288 |

FOREIGN PATENT DOCUMENTS

| | | | |
|---|---|---|---|
| 0269132 | 6/1988 | European Pat. Off. | 280/707 |
| 2359690 | 6/1975 | Fed. Rep. of Germany | 267/64.13 |
| 3536201 | 4/1987 | Fed. Rep. of Germany | 280/707 |
| 2159604 | 12/1985 | United Kingdom | 267/64.13 |

Primary Examiner—Charles A. Marmor
Assistant Examiner—Paul Dickson
Attorney, Agent, or Firm—Konneker & Bush

[57] ABSTRACT

A vehicular suspension system incorporates, at each wheel, a liquid spring which internally utilizes a compressible liquid to generate spring and damping forces that yieldingly resist vertical wheel deflection relative to the vehicle frame. The liquid spring includes a dual piston assembly which divides a main cylinder into bounce and rebound chambers. A rotary metering valve is interposed between the bounce and rebound chambers for controlling the flow of compressible liquid from one chamber to the other during bounce and rebound. The dual piston assembly includes a tubular piston having a modulation chamber coupled in flow communication with the bounce chamber. The spring and damping characteristics of each liquid spring are computer adjusted during vehicle operation by modulating the bounce chamber pressure in response to sensed variations in various liquid spring and vehicle operating parameters.

14 Claims, 5 Drawing Sheets

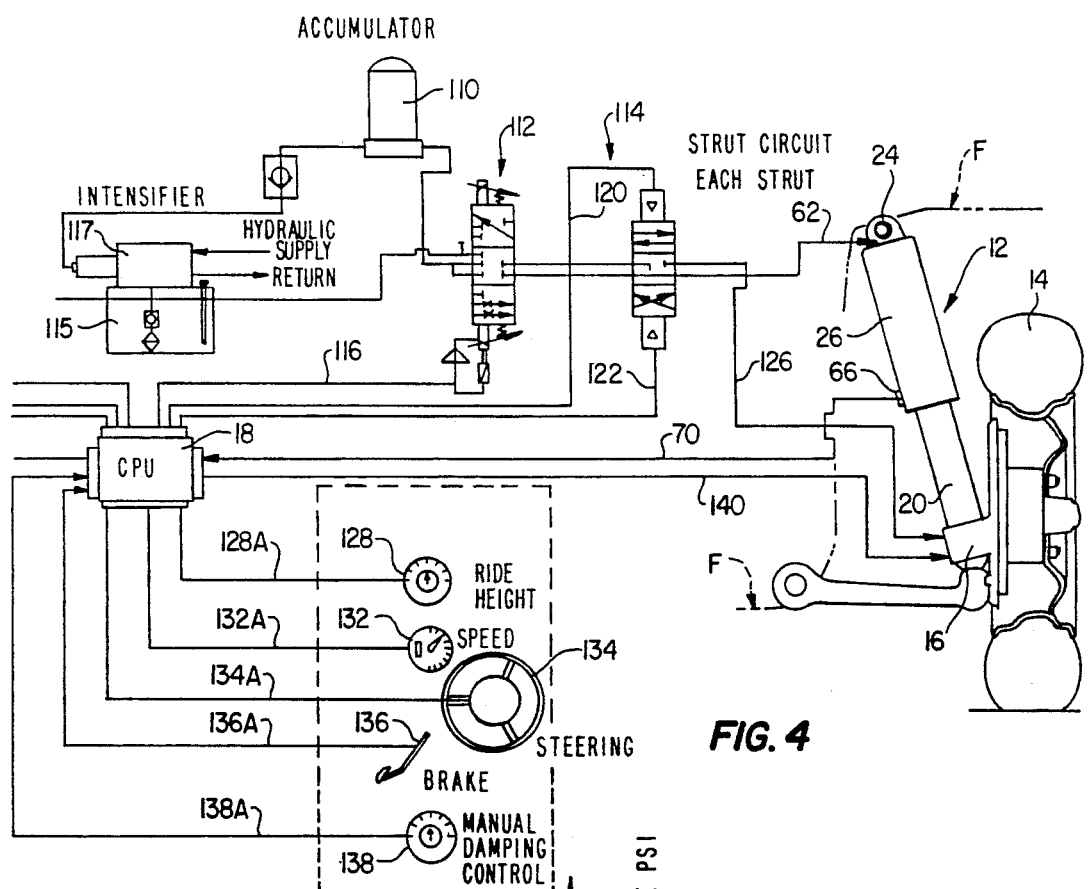
FIG. 4
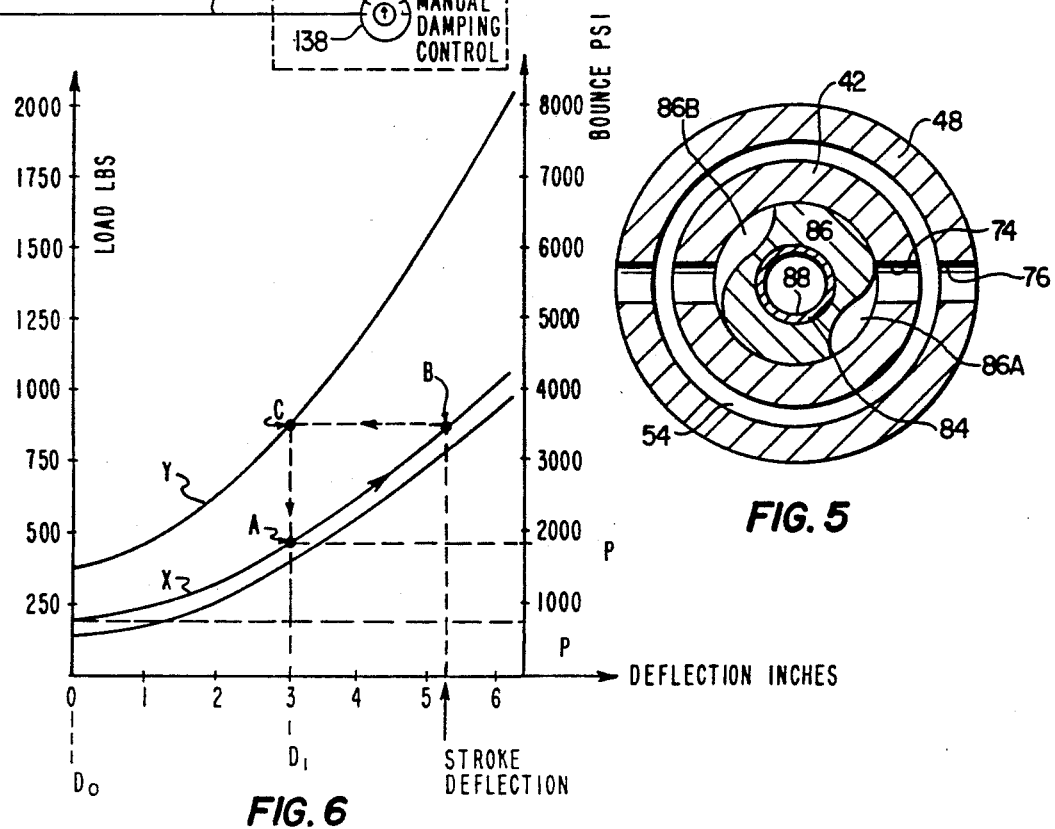
FIG. 5
FIG. 6

DUAL PISTON STRUT

FIELD OF THE INVENTION

This invention relates generally to suspension systems for land vehicles and, in a preferred embodiment thereof, to a liquid spring suspension system in which the spring and damping characteristics of each liquid spring are computer adjusted, during vehicle operation, in response to sensed variations in liquid spring and vehicle operating parameters.

BACKGROUND OF THE INVENTION

Various proposals have been made for replacing the conventional hydraulic shock absorber and exterior coil spring assemblies in vehicular suspension systems with more compact devices known as liquid springs. A conventional liquid spring includes a cylindrical housing having an internal chamber with a compressible liquid therein, a piston reciprocally disposed in the chamber, a rod structure secured to the piston and axially movable into and out of the chamber, and having an external strut projecting outwardly of one of the housing ends. With the liquid spring operatively interconnected between the vehicle frame and an associated wheel support structure, the compressible working liquid generates both spring and damping forces in the suspension system in response to relative axial translation between the rod structure and housing of the liquid spring caused by relative vertical displacement between the wheel and the frame.

The compressible working liquid permits the system to exhibit a non-linear force/deflection curve. This non-linear behavior is important because it offers lower spring rates during normal operation and higher spring rates when the vehicle strikes a bump. Non-linearity in the system is provided by the compressibility of the silicone-based working liquid, which is approximately 1.5 to 2 times more compressible than conventional hydraulic fluid. In operation, the non-linear system provides a spring rate which increases exponentially when the strut moves from its normal static position to full compression. This increase permits the suspension unit to absorb sharp bumps without bottoming out. In contrast, if the spring rate were linear, a substantially greater piston stroke would be required to enable the suspension unit to absorb comparable bounce forces.

Conventional liquid spring suspensions can be tuned and readily adjusted for differing vehicle weights (springing force) and different ride characteristics (dampening). It will be appreciated that non-linear struts that utilize a compressible working liquid for both springing and dampening have a potential for superior performance.

DESCRIPTION OF THE PRIOR ART

Various arrangements have been proposed for selectively adjusting the spring force and/or damping force characteristics of liquid springs to settings which remain essentially constant during vehicle operation until readjusted when the vehicle is at rest. These essentially fixed spring force and damping force characteristics represent at best compromise settings adapted to handle an often wide range of road conditions and vehicle operational inputs (such as steering input, braking forces, vehicle speed and the like) encountered during operation of the vehicle.

Conventional non-linear suspension systems, for example gas-over-oil systems, are too bulky and heavy for certain commercial and military vehicles. There is a continuing interest in reducing the size and weight of such non-linear suspension systems, as well as improving the operational performance.

Examples of the general structure and operation of a liquid spring incorporated in a vehicular suspension system are disclosed in the following patents:

| 4,741,516 | 4,877,222 |
| 4,735,402 | 4,652,008 |

OBJECT OF THE INVENTION

The principal object of the present invention is to provide an improved liquid spring vehicular suspension system in which the spring force and damping force characteristics of the liquid springs are automatically adjusted, during vehicle operation, to compensate for variations in both road conditions vehicle load changes and vehicle operational inputs, or any combination thereof.

SUMMARY OF THE INVENTION

Practicing the present invention, and in accordance with a preferred embodiment thereof, an improved liquid spring vehicular suspension system is provided in which the spring and damping force characteristics of each liquid spring are continuously computer adjusted, during vehicle operation, in response to sensed variations in either or both liquid spring and vehicle operating parameters.

Each liquid spring comprises a main cylinder housing having a pressure chamber formed therein in which a dual piston assembly is reciprocally disposed and axially divides the main pressure chamber into bounce and rebound chambers. The dual piston assembly includes a support piston secured to the main housing and coaxially disposed within the main pressure chamber. A separation piston head is coaxially secured to the static support piston and is slidably and sealingly engaged against the main housing chamber bore for axial movement relative thereto into and out of the pressure chamber. The separation piston head is secured to a tubular piston which includes a tubular strut portion which projects outwardly of the housing and which has a longitudinal bore defining a pressure modulation chamber.

A compressible working liquid is disposed within the bounce and rebound chambers and within the pressure modulation chamber of the tubular piston. An annular flow passage is defined in the annulus between the static support piston and the tubular piston. Flow transfer ports are formed radially through the tubular piston closely adjacent the rebound chamber side of the separator piston head, and radially extending flow transfer ports are formed through the static support piston in communication with the bounce and rebound chambers, respectively. The static support piston is intersected by a longitudinal flow passage which is coupled in flow communication with the bounce and rebound chambers by the flow transfer ports. A rotary metering valve is interposed between the bounce and rebound chambers and is independently operable to respectively meter compressible liquid flow therebetween. The piston modulation chamber is coupled in flow communication with the bounce chamber through a check valve.

Each of the liquid springs has its cylinder housing piston secured to an associated wheel structure, and has its strut secured to the vehicle frame in a manner such that vertical deflection of the wheel structure relative to the frame causes relative axial displacement between the rod structure and the housing and causes the compressible working liquid to exert spring and damping forces that yieldingly and reactively resist vertical wheel displacement. Control means are provided and are respectively operable to selectively and independently operate the rotary metering valve to meter compressible liquid flow through the piston rod ports, to selectively vary the effective volume of the compressible liquid and to selectively vary the pressure of the compressible liquid in the bounce and rebound chambers by modulating the pressure of the compressible liquid in the modulation chamber.

Means are provided for generating liquid spring operating parameter signals including a first signal indicative of the relative axial position of the piston within the housing chamber, and a second signal indicative of the compressible liquid pressure in the bounce chamber. Additionally, means are provided for generating vehicle operating parameter signals which representatively include signals indicative of the sense and magnitude of steering input to the vehicle, the speed of the vehicle, and the braking force being exerted on the vehicle.

Computer means receive the liquid spring operating parameter signals, and the vehicle operating parameter signals, and responsively generate output signals that are used to operate the metering valve and a proportional flow control valve in a manner automatically adjusting the spring and damping characteristics of each liquid spring to maintain a desired ride height deflection and optimum damping force to maximize ride performance characteristics.

BRIEF DESCRIPTION OF THE DRAWINGS

The features of the invention which are believed to be novel are particularly pointed out and distinctly claimed in the concluding portion of this specification. The invention, however, both as to its operation and organization, together with objects and advantages thereof, may best be understood by reference to the following detailed description taken in conjunction with the accompanying drawings, wherein:

FIG. 4 is a simplified electrical, hydraulic and mechanical schematic diagram which illustrates interconnection of the various components of a liquid spring suspension system constructed according to a preferred embodiment of the present invention;

FIG. 5 is a simplified sectional view of a metering valve taken through the line 5—5 of FIG. 3;

FIG. 6 is a performance curve which illustrates strut deflection as a function of dynamic loading;

DETAILED DESCRIPTION OF THE PREFERRED EMBODIMENT

Figure 1:
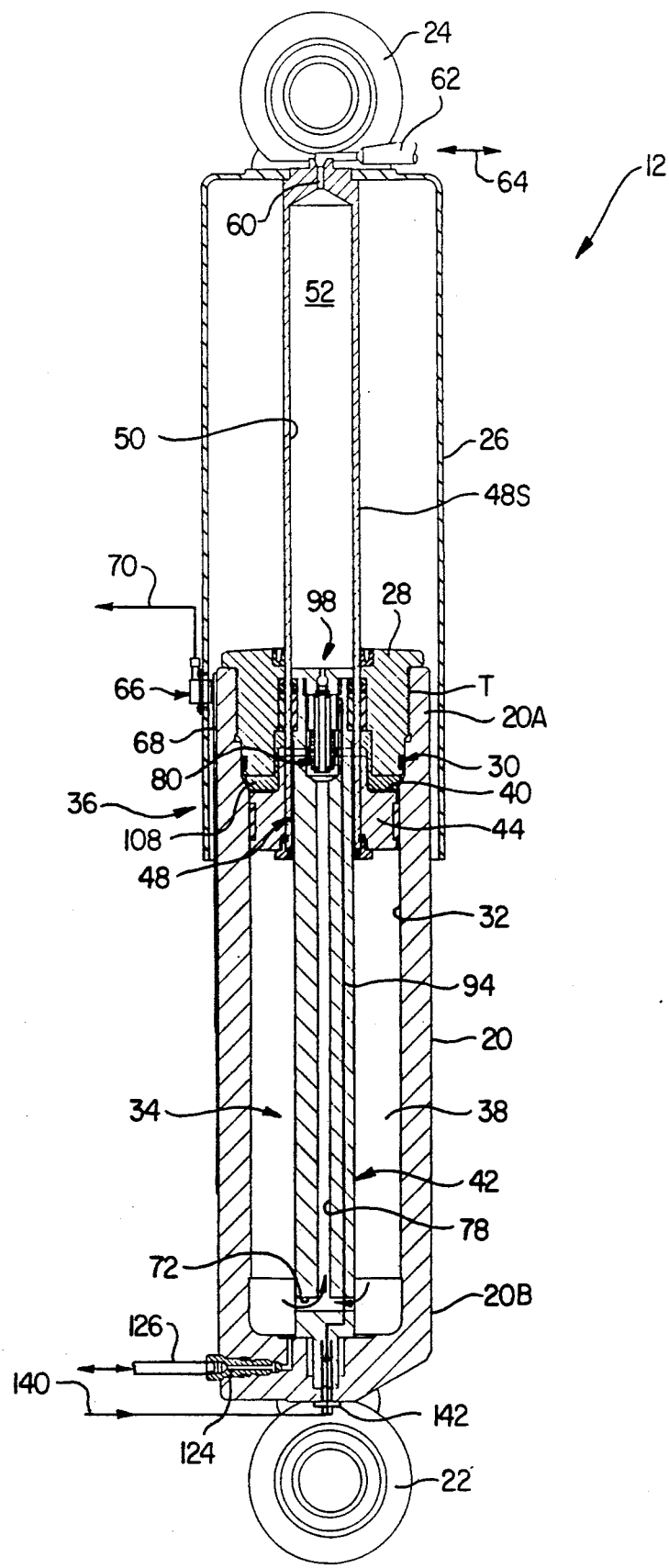
FIG. 1 is a longitudinal view, and full section, of a dual piston strut constructed according to the teachings of the present invention.

In the description which follows, like parts are marked throughout the specification and drawings with the same reference numerals, respectively. The drawing figures are not necessarily drawn to scale and the proportions of certain parts have been exaggerated for purposes of clarity.

Referring now to FIG. 1 and FIG. 4, an improved liquid spring vehicular suspension system 10 incorporates a generally vertically oriented dual piston liquid spring 12 at each wheel 14 of the vehicle. The liquid spring 12 is adapted for attachment at its upper end to a vehicle frame F, and at its lower end to the axle spindle 16 of its associated wheel 14. The liquid spring 12 is operable to provide the requisite suspension spring and damping forces at each wheel location. As described below, the liquid spring 12 is controlled by a computer 18 which continuously and automatically adjusts key operational aspects of the liquid spring 12 in response to sensed variations in selected vehicle and liquid spring operating parameters.

The liquid spring 12 includes an elongated main cylinder housing 20 having an upper housing end 20A and a lower housing end 20B. A spherical bearing 22 is secured to the lower housing end 20B and is connected to the wheel support structure 16 as shown in FIG. 4. A spherical bearing 24 is secured to a cylindrical housing boot 26 in which the main housing 20 is telescopically received. The spherical bearing assembly 24 is adapted for attachment to a vehicle frame (not shown). An annular gland member 28 is connected into the upper housing end 20A of the main cylinder housing 20 by a threaded union T. Interposed between the gland 28 and the upper housing sidewall 20A is an annular, elastomer seal 30. The main cylinder housing 20 has a cylindrical bore 32 which defines a pressure chamber 34 for receiving compressible silicone-based working liquid.

A dual piston assembly 36 is reciprocally disposed in and axially divides the main pressure chamber 34 into a bounce chamber 38 and a rebound chamber 40. The dual piston assembly 36 includes a static support piston 42 which is secured to the lower end 20B of the main housing 20 and is coaxially disposed within the main pressure chamber 34. A separation piston head 44 is coaxially secured to the static support piston 42 and is slidingly and sealingly engaged against the main housing chamber bore 32 for axial extension and retraction movement relative thereto into an out of the pressure chamber 34. The separation piston head 44 is sealed against the main housing chamber bore 32 by an annular seal 46. The separation piston head 44 is attached to a tubular piston 48 having a longitudinal bore 50 defining a pressure modulation chamber 52. The tubular piston 48 has a tubular strut portion 48S projecting outwardly of the main cylinder housing 20 and is mechanically connected to the housing boot 26 and the spherical bearing 24

The upper end of the support piston 42 is received in telescoping engagement within the bore 50 of the tubular piston 48. As can best be seen in FIG. 3, a damping flow annulus 54 is formed between the overlapping end portions of the static support piston 42 and the tubular piston 48. The annulus 54 between the static support piston and the tubular piston is sealed by an annular gland seal 56. The tubular piston 48 is sealed against the bore of the annular housing gland 28 by an annular gland seal 58. A flow port 60 is formed through the head of the tubular piston 48 and is engaged by a hydraulic fitting 62 for permitting the flow of compressible working liquid into and out of the pressure modulation chamber as indicated by the double arrow 64.

The tubular piston 48 and separator piston head 44 are thus extendable into and retractable out of the main cylinder chamber 34 in response to differential pressure conditions which are imposed within the bounce chamber 38 relative to the rebound chamber 40, and relative to the pressure modulation chamber 52.

Figure 2:
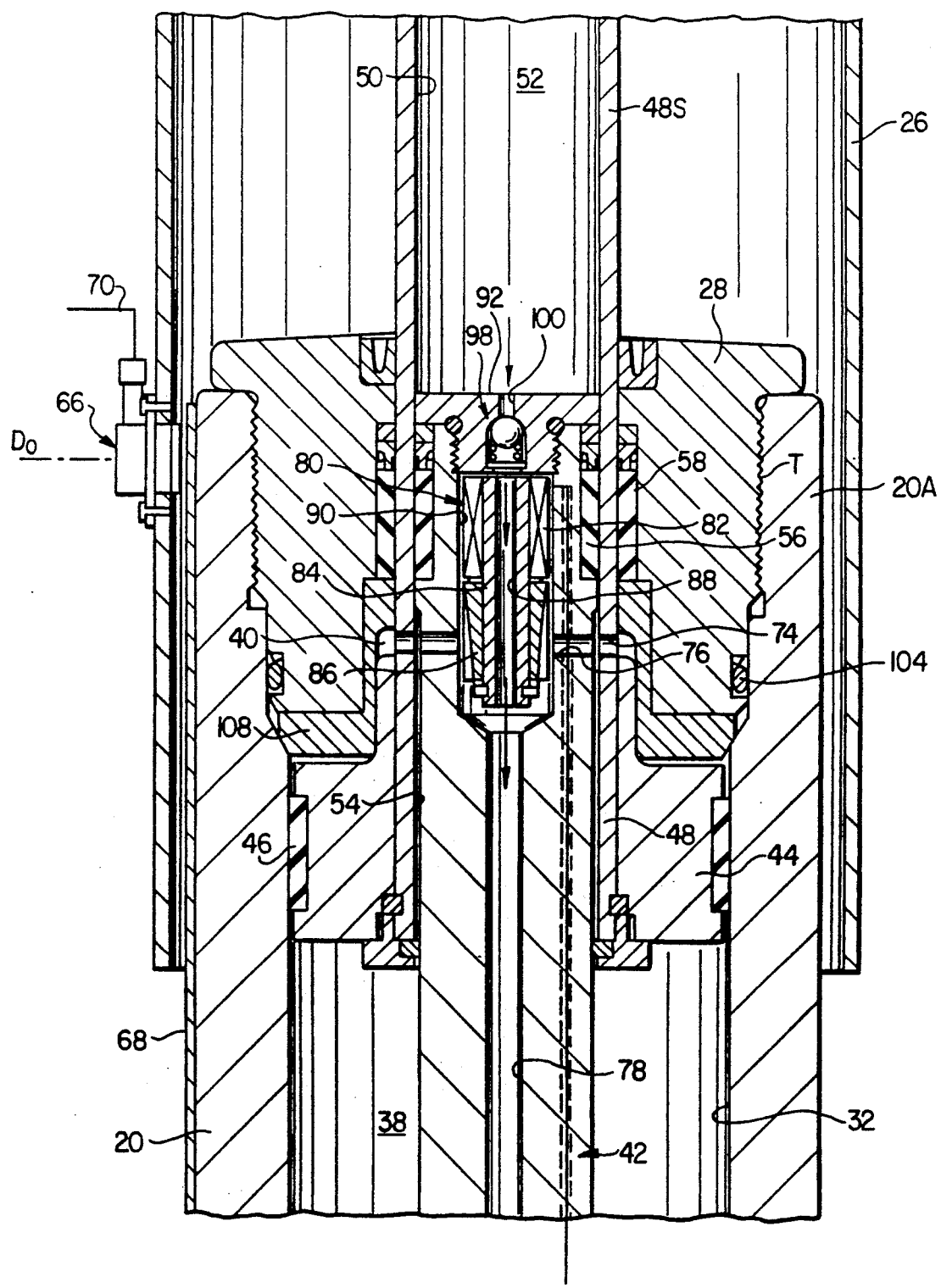
FIG. 2 is an enlarged view, partially broken away, showing the relative position of the dual piston components in the maximum ride height deflection position.

The deflection position of the separation piston head 44 is detected by a position sensor 66 which is mounted onto the housing boot 26. The position sensor 66 carries a conductor which forms one plate of a capacitor, while the second plate of the capacitor is formed by a tapered conductive strip 68 attached to the external side surface of the main cylinder housing 20. The capacitance produced by the sensor plate and the tapered conductor strip 68 varies substantially linearly as the sensor head is moved along the tapered strip. The effective capacitor value produced by this arrangement forms a portion of an electronic bridge circuit which generates an electrical analog output signal 70 which is directly proportional to the radial displacement of the sensor head 66 from the tapered strip 68. Since the strip 68 has a linear taper, the radial displacement of the sensor plate is directly proportional to axial displacement of the sensor head from a reference position $D_0$ (FIG. 2). The analog electrical output signal 70 forms one of the vehicle operating parameter signals which is input to the computer 18.

Interchamber flow communication between the bounce chamber 38 and the rebound chamber 40 is provided by flow transfer ports 72 which are formed radially through the static support piston closely adjacent the lower housing end portion 20B on the bounce chamber side of the piston, and by flow transfer ports 74 which are formed radially through the static support piston closely adjacent the upper housing end portion 20A on the rebound chamber side of the separator piston head 44. The upper flow transfer ports 74 are in flow communication with the damping flow annulus 54. The flow transfer ports 76 are formed radially through the tubular piston 48 closely adjacent to the rebound chamber side of the separator piston head, in flow communication with the rebound chamber 40 and with the damping flow annulus 54. The static support piston 42 is intersected by a longitudinal flow passage 78 which is in flow communication with the radial flow ports 72 and the bounce chamber 38, and also in flow communication with the upper flow transfer ports 74 and damping flow annulus 54.

According to one aspect of the invention, a variable flow restrictor 80 is interposed between the bounce chamber 38 and the rebound chamber 40. Preferably, the variable flow restrictor 80 is a rotary metering valve which is independently operable to meter compressible liquid flow from the bounce chamber 38 to the rebound chamber 40, and from the rebound chamber 40 to the bounce chamber 38, respectively. The metering valve 80 includes a D.C. electrical stepping motor 82 having a rotor 82R mounted for rotation about a tubular mandrel 84.

Connected to the rotor 82R for rotation on the tubular mandrel 84 is a metering valve body 86 having axially extending peripheral passages 86A, 86B which, upon appropriate rotation of the rotor 82R, may be moved into and out of metering registration with the flow transfer ports 74 to thereby selectively meter compressible liquid flow between the bounce chamber 38 and the rebound chamber 40. The rotor 82R of the stepping motor 82 is rotatable through nine step increments of ten degrees each so that the valve body metering passages are selectively positionable from partially open (maximum damping), as shown in FIG. 5, to fully open (minimum damping).

The tubular mandrel 84 has a central bore 88 disposed in flow communication with the flow passage 78 and extends longitudinally through the support piston 42. The metering valve 80 is mounted within a counterbore 90 which is formed in the upper end of the static support piston 42. The metering valve assembly 80 is confined within the counter bore 90 by a threaded retainer cap 92. D.C. electrical power for operating the stepping motor 82 is provided by a conductor 94 which is routed through a longitudinal bore 96 formed through the sidewall of the support piston 42. The piston rod 42 and the main housing cylinder 20 form the D.C. return conductor.

A check valve 98 is mounted within a pocket in the retainer cap and is spring loaded to close a discharge flow passage 100 and is yieldable to connect the pressure modulation chamber 52 in fluid communication with the central bore 88 of the tubular mandrel 84 in response to a predetermined pressure differential. According to this arrangement, a positive pressure differential in the pressure modulation chamber 52 relative to the bounce chamber 38 causes the check valve 98 to open and thereby permit the bounce chamber 38 to be pressurized to the pressure level of the pressure modulation chamber 52. The check valve 98 is thus operable to permit one way interchamber flow from the modulation chamber to the bounce chamber 38, but blocks reverse flow.

The tubular piston 48 is slidably and sealingly engaged against the annular housing gland 28, and the slidable union is further sealed by an annular wiper seal 102. The rebound chamber is further sealed by an 0-ring seal 104 which is mounted in an annular slot 106 formed in the housing gland 28. Impact forces applied by the separator piston 44 against the annular housing gland 28 are reacted by a resilient bounce pad 108.

When the vehicle is at rest, the portion of its weight supported by the wheel structure and the liquid spring 12 exerts a downward axial force on the tubular piston 48 which tends to force the separator head 44 further into the main pressure chamber 34, thereby reducing the volume of the bounce chamber 38. Downward movement of the separator piston also reduces the volume of the pressure modulation chamber, thereby compressing and pressurizing the working liquid within the pressure modulation chamber 52.

Figure 3:
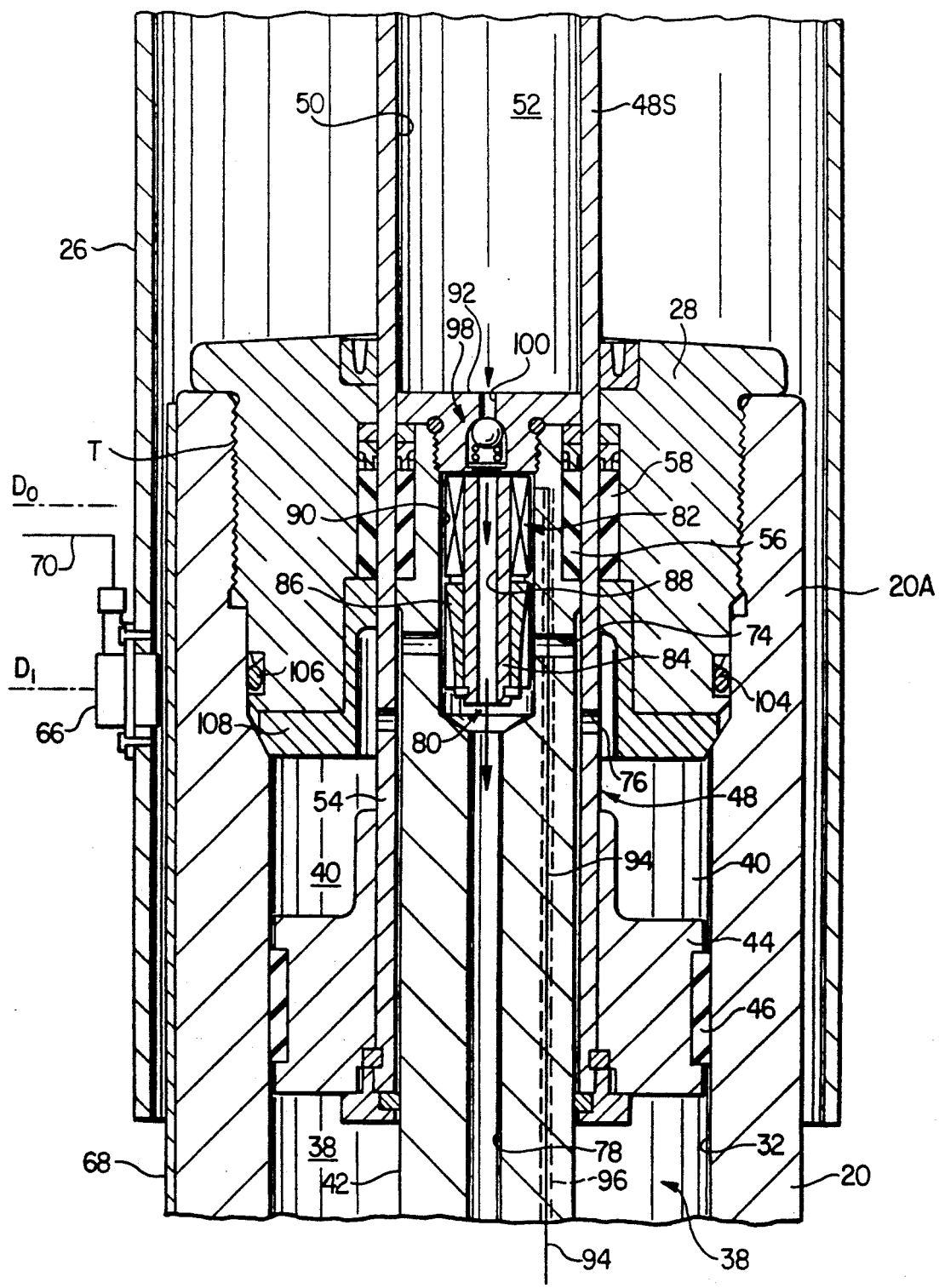
FIG. 3 is similar to FIG. 2 showing the relative positions of the dual piston components illustrating the relative positions of the dual piston components in response to bounce extension of the main tubular piston relative to the static support piston.

As the separator piston 44 strokes downwardly, the compressible working liquid is forced through the flow ports 72 upwardly through the flow passage 78 where it is discharged through the rotary metering valve 80 into the flow transfer ports 74, 76. When the net upwardly directed fluid pressure on the face of the static support piston 42 and on the face of the separator piston 44 equals the load of the vehicle weight born by its wheel structure, the tubular piston 48 is at a vertical equilibrium deflection point D within the main pressure chamber 34 (FIG. 3). This equilibrium point established the ride height of the vehicle when it is at rest or travelling along essentially level terrain.

When an additional upwardly directed bounce force is imposed on the wheel structure, the main cylinder housing 20 is moved further upwardly along the tubular piston 48 and the flow of compressible working liquid is metered through the metering valve 80 to equalize the pressures in the bounce and rebound chambers. According to an important feature of the invention, the pressure of the bounce chamber 38 is modulated by flow from the pressure modulation chamber 52 to restore the deflection of the separator piston 44 to a desired ride height $D_1$. This is accomplished by the computer 18 which receives the analog signal 70 which is representative of the instantaneous ride height deflection. In response to the ride height deflection signal 70, as well as other vehicle operation parameters, the computer 18 directs an increase or decrease in the pressure of the pressure modulation chamber 52 by directing the flow of compressible working liquid from a accumulator through a proportional flow control valve 112 and a directional flow control valve 114. The accumulator 110 is charged from a compressible liquid reservoir 115 by a hydraulic intensifier 117.

Referring now to FIG. 6, the load deflection response of the liquid spring 12 is illustrated. In this example, the piston of the liquid spring 12 is at a vertical equilibrium deflection point A, which corresponds with a stroke deflection $D_1$ of three inches, and a precharged pressure level P of about 1800 psi in the bounce and rebound chambers. In response to a bounce impact, and in the absence of a modulating pressure, the tubular piston 48 will stroke through the main pressure chamber 34, with the operating point following along the non-linear load deflection curve X. Without pressure modulating compensation, the piston will continue its stroke until bottoming occurs. However, upon the application of a high pressure boost of compressible liquid from the pressure modulation chamber 52 through the check valve 98 into the bounce chamber 38, the piston stroke is reversed at point B, with the tubular piston 48 being retracted until equilibrium is reached at the desired ride height deflection $D_1$ at point C on the load deflection curve Y. As the bounce forces are reacted, the pressure within the bounce chamber equalizes with the pressure in the rebound chamber, thereby causing the operating point to return to point A on the load deflection curve X. The load deflection curves X, Y generally define the limits of an operational load deflection envelope. The operating point A can be established and maintained at any point within the operational envelope by appropriate modulation of the pressure level within the modulation pressure chamber 52.

The proportioning flow control valve 112 is controlled by a flow rate control signal 116 generated by the computer 18. The proportioning control valve is driven by a pilot actuator 118. The pilot actuator 118 moves a shuttle within the valve to provide flow rate proportioning control of compressible liquid from the reservoir 110 to the directional control valve 114 from a first position in which its inputs are fully blocked, to a second position in which both input ports are fully open to receive pressurized working liquid from the reservoir 110, to a third position which one output port is vented and one output port is blocked. The three position, four way proportioning control valve 112 is also operable to provide continuously variable flow rate control from fully closed (blocked) to fully open (vented).

The directional flow control valve 114 is responsive to computer control signals 120, 122 for selectively charging the bottom port 124 which is in flow communication with the bounce chamber 38, while venting the top port 60 which is in flow communication with the modulation chamber 52 in a first position, and is movable to a second position in which the bounce chamber 38 is blocked and the modulation chamber 52 is open to receive pressurized working liquid from the accumulator 110, and movable to a third position in which the pressure modulation chamber 52 is charged and the bounce chamber 38 is vented to permit pressurized working fluid to be returned to the hydraulic supply reservoir 110.

According to this arrangement, the directional control valve 114 is operable to switch the flow through the hydraulic conduits 62, 126 so that the pressure modulation chamber 52 can be switched from charge to discharge, and the bounce chamber 38 can be switched from charge to discharge according to computer control. Moreover, both the pressure modulation chamber 52 and the bounce chamber 38 may be charged at the same time and both can be blocked at the same time. The pressure modulation chamber 52 and the bounce chamber 38 can be selectively blocked or opened for charging and venting, as determined by the vehicle operating parameters.

The vehicle operating parameters include input signals developed by a manually/automatic settable ride height controller 128, a vehicle speed transducer 132, a steering transducer 134, a braking force transducer 136 and a manually settable damping controller 138. The ride height controller 128, the vehicle speed transducer, steering transducer, brake transducer, ride height sensor and manual damping controller each produce analog signals which are subsequently digitized by an analog-to-digital converter (ADC) for input to the computer 18. The computer 18 receives these analog and digital vehicle operating parameter signals and generates control signals to the proportioning flow controller 112 and the directional flow controller 114, as well as a D.C. metering control signal 140 which is electrically connected to the power conductor 94 by a connector 142 (FIG. 1) and applied to the electrical stepping motor of the metering valve 80 for automatically adjusting the spring and damping characteristics of the liquid spring 12 to maintain a desired ride height deflection.

The use of the proportioning flow control valve 112 and directional flow control valve 120 in conjunction with the pressure modulation chamber 52 and the bounce chamber 38 permits the bounce and rebound damping characteristics of the liquid spring 12 to be selectively, independently and quickly varied over a wide adjustment range. For example, with the metering valve 80 rotated to its maximum position relative to the flow control ports 74, 76 the damping forces on the static support piston 42 and the tubular piston 48 are at their minimum magnitudes, with the valve body 86 being positioned at its least restrictive setting. At the other extreme of the damping range, when the metering valve body 86 is in its fully closed position as shown in FIG. 5, the available bounce and rebound damping forces are maximized. Between those two extremes are an infinite number of relative valve positions and correspondingly available bounce and rebound damping force settings.

Not only may the metering flow be variably restricted by the metering valve 80, but the pressure modulation chamber 52 and the bounce chamber 38 may be selectively charged or vented and opened or closed with respect to the output of the propositioning flow controller valve 112, whereby the bounce chamber 38 can be modulated instantaneously by pressure changes in the pressure modulation chamber 52 to further modify the damping characteristics of the liquid spring 12. This permits the pressure modulation chamber 52 to be used, for example, to store compression energy as the housing 20 is deflected in one vertical direction, and to release the stored compression energy as the housing deflects in the opposite vertical direction.

Operation of the liquid spring 12 is uniquely controlled during vehicle operation by the control input signals 128 (ride height setting), 132A (vehicle speed), 134A (steering), 136A (braking rate), 138A (manual damping) and 70 (deflection height). The deflection signal 70 which is transmitted from the position sensor 66 has a magnitude which is proportional to the deflection distance $D_1$ (FIG. 3) as measured from the fully extended position $D_0$, and is therefore indicative of the axial position of the piston head 44 relative to the opposite ends of the main cylinder pressure chamber 34.

According to this embodiment, both the spring force characteristics and the bounce and rebound damping characteristics of the liquid spring 12 are continuously monitored and automatically varied in response to variations in the vehicle operating parameters and the deflection operating parameter of the liquid spring itself. For example, the previously described continuous sensing of the deflection position of the piston head 44 enables the computer 18 to compute, at any given instant, the direction of relative travel of the piston 48, its velocity, and its acceleration relative to the main cylinder housing 20, and responsively vary the controller signals 116, 120 to the proportioning flow control valve 112 and the flow direction control valve 114 to substantially instantaneously adjust the effective piston velocity and/or acceleration during either a bounce or rebound stroke of the wheel 14. It will be appreciated that the suspension system 10 may be conveniently utilized to continuously and automatically adjust the spring and damping characteristics of the liquid spring 12 to generally optimize the suspension performance over a wide range of road conditions the vehicle may encounter at any given instant.

The suspension system 10 takes full advantage of the instantaneous compliance and compressibility of the silicone compressible working liquid. Because of the compressible nature of the silicone working liquid, the suspension system 10 can respond faster to bounce impulses than gas/oil systems because the silicone working liquid does not require hydraulic flow before compliance can occur. The instantaneous reaction and greater damping power reduces not only the magnitude of impact but also significantly reduces the number of sequential impact cycles transmitted to the frame, which improves all aspects of handling and ride comfort. Moreover, the improved suspension system 10 is characterized by lighter mass weight and package size, thereby providing lighter unsprung weight which further enhances ride handling characteristics.

The improved suspension system 10 is thus capable of carrying a wide range of loads and of varying the load force relationship of the liquid spring slowly and instantaneously to permit a vehicle to travel over rough courses with the suspended chassis remaining stable and comfortable. The system thus accommodates large variations of static and dynamic loading with reduced dynamic affect on the suspended chassis. The suspension system has the ability to sense the movement of the piston strut 48 including its direction, its instantaneous position and acceleration, and modifies the damping function and bounce or rebound to maximize its reduction of transmitted force to the chassis and thereby improve ride comfort.

The ride height sensor signals are read by the computer which generates appropriate output signals the proportional flow controller and the directional flow controller valves to produce the desired pressure force and the required damping level to optimize the chassis ride. For a four wheeled vehicle, the outputs of the four load ride height deflection sensors represent the chassis dynamic motions and describe the heave, pitch, roll and warp modes of the chassis relative to the road. The suspension system 10 uses the damping force to counteract the acceleration forces and produces an increase or decrease in the modulation of the spring forces to reduce or increase the displacement at the appropriate strut to affect a more stable ride over an uneven course.

The liquid spring suspension units function both as a spring and as a shock absorber in which both functions are capable of modulation within desired ranges to increase or decrease damping to provide harder or softer performance and increase or decrease the spring force to respond to dynamic road conditions, unsprung mass and chassis motions to effectively reduce the chassis dynamic motions and to produce a smoother, more comfortable ride. The signal from the ride height sensors at each strut are sensed by direction and position in relation to a desired ride height, thereby providing real time adjustment by the computer. The ride height position signals are continuously monitored and are used in the control system to compare to other struts indicating chassis, heave, roll and warp modes of operation and corrective damping and spring forces are instantaneously modified within the struts to obtain the desired ride and vehicle control.

Figure 7:
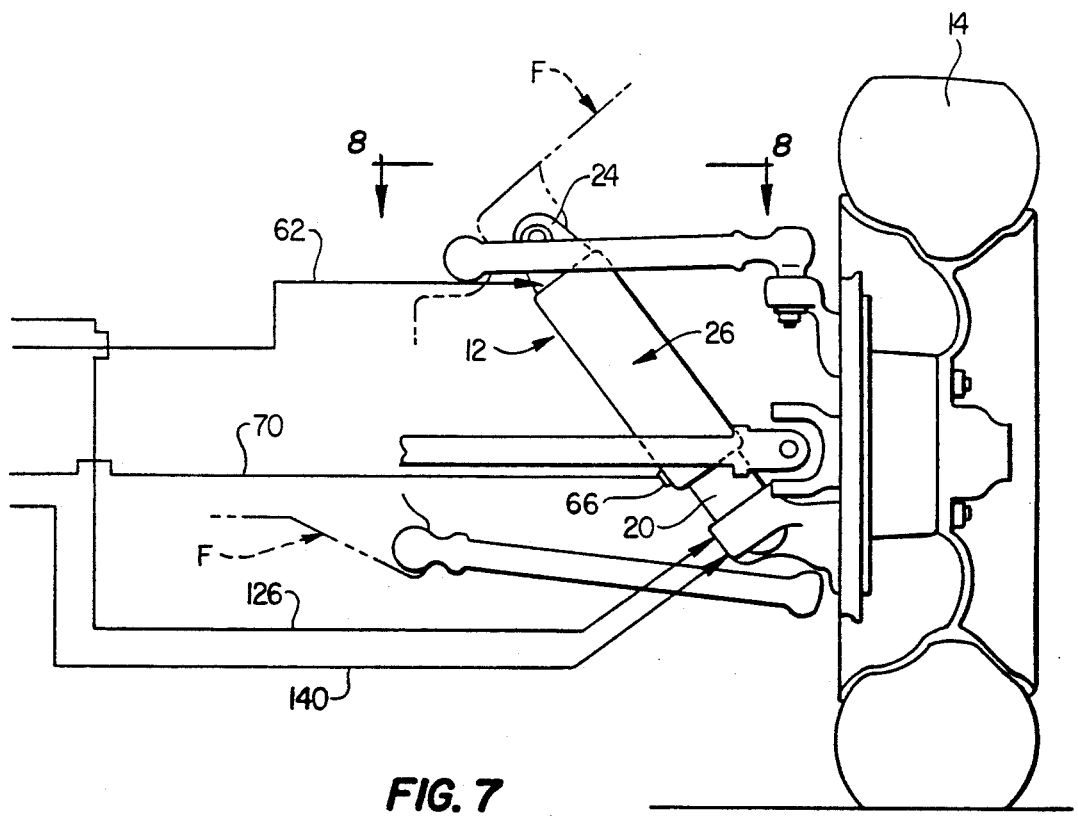
FIG. 7 is a simplified schematic diagram showing the liquid spring of FIG. 1 in a double wishbone (A-frame) assembly.
Figure 8:
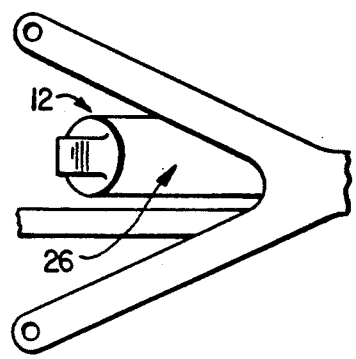
FIG. 8 is a sectional view of the double wishbone (A-frame) assembly of FIG. 7 taken along the line 8—8.

It will be appreciated that the suspension system 10 provides greater damping force capability and the ability to change spring force rapidly. This provides improved performance capability over prior art suspension systems. Moreover, the suspension system of the present invention simplifies assembly by reducing both the numbers and complexity of the liquid spring components. The overall system cost and weight are reduced correspondingly. Moreover, improved ride quality is provided over a greater load variation, thereby reducing friction and improving reliability. Consequently, many of the factors which have impeded the development of practical dynamic ride control suspension systems have been overcome. The suspension system of the present invention is adaptable to a wide variety of applications, in which the following capabilities are provided:

a. provide fast compliance for levelling system
b. able to bank into corners
c. level ride on a curve
d. reduce nose dive when braking
e. reduce nose rise when accelerating
f. decrease chassis pitch
g. decrease chassis roll h. reduce chassis bounce cycles
i. reduce peak bounce forces transmitted to the chassis
j. since the spring force is riding on compressible liquid, the steering bearing reaction is reduced thereby eliminating a separate bearing which would otherwise be required for conventional steel spring reaction and rotation.
k. riding on compressible fluid reduces noise and high frequency vibration to the chassis by better isolation
l. electronic damping control can tune the damping forces to provide optimum system requirement for a smooth ride with damping differential in bounce and rebound
m. electronic hydraulic pressure in flow control provides spring force changes in real time so that forces can be modulated for chassis pitch, roll, and vertical (heave) motion cancellation
n. reduced stroke length provides a better ride than conventional suspension since there is no required stroke to accommodate changes in load capacity of the vehicle It should be noted that the suspension system 10 shown in FIG. 4 is representative for a single wheel assembly in a McPherson configuration, and that except for common components such as the computer and hydraulic reservoir, accumulator and intensifier, corresponding components including the liquid spring are required for each wheel. The liquid spring of the present invention may be installed in other suspension configuration, such as the double wishbone (A-frame) configuration of FIG. 7. The sensing of the piston deflection position may be achieved by other means, for example by a photoelectric position sensor, a magnetoresistive sensor, or an inductive sensor. It is therefore contemplated that the appended claims are intended to cover all embodiments of inventions and modifications thereof which do not depart from the sphere and scope of the invention.

What is claimed is:

1. A strut for suspending a wheel assembly from a vehicle frame comprising, in combination:
    a main cylinder housing adapted for attachment to a wheel assembly, said main cylinder housing having a bore defining a pressure chamber and having an inlet port for admitting a compressible liquid into said housing pressure chamber;
    a tubular piston adapted for attachment to a vehicle frame, said tubular piston having a bore defining a pressure modulation chamber and having an inlet port for admitting compressible liquid into the pressure modulation chamber, said tubular piston having an annular head disposed in slidable, sealing engagement against the main cylinder housing bore thereby dividing the main cylinder housing chamber into a bounce chamber and a rebound chamber;
    a piston rod mounted on the main cylinder housing and projecting through the main cylinder housing chamber into slidable, sealing engagement against the bore of the tubular piston;
    said piston rod and tubular piston being intersected by flow passages for connecting the bounce chamber into flow communication with the rebound chamber; and,
    valve apparatus coupled in fluid communication with the bounce chamber, rebound chamber and modulation chamber for controlling the flow of compressible liquid from one chamber to another.

2. A strut for suspending a wheel assembly from a vehicle frame comprising, in combination:
    a main cylinder housing adapted for attachment to a wheel assembly, said main cylinder housing having a bore defining a pressure chamber and having an inlet port for admitting a compressible liquid into said housing pressure chamber;
    a tubular piston adapted for attachment to a vehicle frame, said tubular piston having a bore defining a pressure modulation chamber and having an inlet port for admitting compressible liquid into the pressure modulation chamber, said tubular piston having an annular head disposed in slidable, sealing engagement against the main cylinder housing bore thereby dividing the main cylinder housing chamber into a bounce chamber and a rebound chamber;
    a piston rod mounted on the main cylinder housing and projecting through the main cylinder housing chamber into slidable, sealing engagement against the bore of the tubular piston;
    said piston rod and tubular piston being intersected by flow passages for connecting the bounce chamber into flow communication with the rebound chamber;
    valve apparatus coupled in fluid communication with the bounce chamber, rebound chamber and modulation chamber for controlling the flow of compressible liquid from one chamber to another, said valve apparatus including
    a variable flow restrictor interposed between the bounce chamber and the rebound chamber for adjusting the rate of flow of compressible liquid from the bounce chamber to the rebound chamber and from the rebound chamber to the bounce chamber, respectively; and,
    a check valve interposed between the pressure modulation chamber and the bounce chamber for permitting one way flow of compressible liquid from the pressure modulation chamber into the bounce chamber, and for blocking reverse flow thereof.

3. A strut as defined in claim 2, said variable flow restrictor comprising a rotary metering valve having flow passages which are rotatable into and out of flow communication with the bounce chamber and the rebound chamber.

4. A strut as defined in claim 1, said piston rod being intersected by a longitudinal bore and radial flow transfer ports providing flow communication between the bounce chamber and the rebound chamber, said valve apparatus including a variable flow restrictor interposed between the longitudinal flow passage and the radial flow ports.

5. A strut as defined in claim 1, said valve apparatus including a tubular mandrel connecting the pressure modulation chamber in flow communication with the bounce chamber, and including a variable flow restrictor mounted for rotation on said tubular mandrel, said variable flow restrictor being operably interposed between the bounce chamber and the rebound chamber.

6. A suspension system for use on a vehicle having a frame, a wheel structure, and means for generating a vehicle operating parameter signal, said suspension system comprising:
    a liquid spring adapted to be operably interposed between the vehicle frame and wheel structure for utilizing a compressible liquid to exert spring and damping forces to reactively control relative vertical displacement between the vehicle frame and wheel structure, said liquid spring including a main cylinder having a bore defining a main pressure chamber and a duel piston assembly disposed within said main pressure chamber, said dual piston assembly including a piston rod attached to the main cylinder and a tubular piston movably mounted on the piston rod, said tubular piston having a head portion dividing the main pressure chamber into a bounce chamber and a rebound chamber, a tubular strut portion projecting out of the main pressure chamber, and a bore formed in the tubular strut portion defining a pressure modulation chamber, said pressure modulation chamber having an inlet port for admitting compressible liquid into said pressure modulation chamber;

valve apparatus coupled in fluid communication with the bounce chamber, rebound chamber and pressure modulation chamber for controlling the interchamber flow of compressible liquid from one chamber to another; and control apparatus coupled to said liquid spring for controlling the bounce chamber pressure, pressure modulation chamber pressure and interchamber flow rate in response to a sensed variation in a vehicle operating parameter signal.

7. A suspension system as defined in claim 6, wherein said control apparatus includes:

means for generating a liquid spring operating parameter signal; and, a computer coupled to the liquid spring and vehicle operating parameter signals and to the control apparatus for adjusting the bounce chamber pressure, modulation chamber pressure and interchamber flow rate in response to a sensed variation in the vehicle operating parameter signal and in response to a sensed variation in the liquid spring operating parameter signal.

8. A suspension as defined in claim 7 wherein:

the liquid spring operating parameter generating means being operable to produce a signal indicative of the position of the movable piston head relative to the piston rod within said housing chamber.

9. A suspension system as defined in claim 6 wherein:

said vehicle operating parameter generating means includes a manually operable controller being operable to produce an adjustable output signal indicative of the desired ride height deflection of the vehicle.

10. A suspension system as defined in claim 6 wherein:

said vehicle operating parameter generating means includes a transducer being operable to produce an output signal proportional to the steering input to the vehicle.

11. A suspension system as defined in claim 6 wherein:

said vehicle operating parameter includes a transducer being operable to produce an output signal proportional to the speed of the vehicle.

12. A suspension system as defined in claim 6 wherein:

said vehicle operating parameter generating means includes a transducer being operable to produce an output signal proportional to the braking force exerted on the vehicle.

13. A suspension system as defined in claim 6 wherein:

said vehicle operating parameter generator means includes a manual controller being operable to produce an adjustable output signal indicative of a predetermined damping factor.

14. A liquid spring suspension system for use on a vehicle having a frame and a wheel structure, said suspension system comprising:

a liquid spring including a tubular housing having a main chamber disposed therein for containing a compressible liquid, a tubular piston reciprocally disposed in said chamber and having a head portion dividing the main chamber into bounce and rebound chambers and having a bore, a piston rod mounted on said housing and slidably and sealingly engaged against the bore of the tubular piston, said tubular piston having an external end portion disposed outwardly of said housing and internally defining a pressure modulation chamber having a flow port through which a compressible liquid may be flowed into and out of said pressure modulation chamber, and a damping flow annulus defined between the bounce and rebound chambers;

means for operatively associating said liquid spring with said frame and said wheel structure in a manner such that relative vertical movement between said frame and said wheel structure causes relative axial translation between said tubular piston and said housing; and, means for adjustably restricting interchamber flow between the bounce and rebound chambers in response to variation in at least one vehicle operating parameter, to thereby selectively vary the damping force of said liquid spring.

* * * * *

UNITED STATES PATENT AND TRADEMARK OFFICE
CERTIFICATE OF CORRECTION

PATENT NO. : 5,152,547

DATED : October 6, 1992

INVENTOR(S) : Leo W. Davis

It is certified that error appears in the above-indentified patent and that said Letters Patent is hereby corrected as shown below:

Column 4, line 64, insert "." after the number "24".

Column 7, line 3, "D" should be --$D_1$--.

Column 13, line 6, "duel" should be --dual--.

Signed and Sealed this

Fifth Day of April, 1994

BRUCE LEHMAN

Attest:

Attesting Officer

Commissioner of Patents and Trademarks